United States Patent
Bhandari et al.

(10) Patent No.: US 8,665,831 B2
(45) Date of Patent: Mar. 4, 2014

(54) METHOD AND APPARATUS FOR CONTROLLING CELLULAR RESELECTION ATTEMPTS ON A COMPUTING DEVICE

(75) Inventors: Puneet Bhandari, Sunnyvale, CA (US); Anand Kashikar, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 303 days.

(21) Appl. No.: 12/885,503

(22) Filed: Sep. 18, 2010

(65) Prior Publication Data

US 2012/0069816 A1    Mar. 22, 2012

(51) Int. Cl.
*H04W 4/00* (2009.01)
*H04W 36/00* (2009.01)

(52) U.S. Cl.
USPC .......................................... 370/332; 455/437

(58) Field of Classification Search
None
See application file for complete search history.

(56) References Cited

U.S. PATENT DOCUMENTS

| | | | |
|---|---|---|---|
| 2008/0057948 A1* | 3/2008 | Mittal et al. | 455/426.1 |
| 2009/0088160 A1* | 4/2009 | Pani et al. | 455/436 |
| 2009/0238117 A1* | 9/2009 | Somasundaram et al. | 370/328 |
| 2010/0110945 A1* | 5/2010 | Koskela et al. | 370/310 |
| 2010/0279693 A1* | 11/2010 | Hole | 455/436 |

* cited by examiner

*Primary Examiner* — Chirag Shah
*Assistant Examiner* — Joshua Smith

(57) ABSTRACT

A method and apparatus for controlling cellular reselection attempts on a computing device is disclosed. A computing device performs an automated process to repeatedly check the adequacy of the serving cell that it is currently assigned to. The computing device performs the check to determine whether it should perform a neighbor search and cell reselection. If the computing device determines the presence of particular conditions, it can perform the reselection by a default automated process. On the other hand, if the computing device determines criteria based, at least in part, on past instances, the computing device can modify the default automated process and skip attempts at performing neighbor search and cell reselections.

20 Claims, 3 Drawing Sheets

# METHOD AND APPARATUS FOR CONTROLLING CELLULAR RESELECTION ATTEMPTS ON A COMPUTING DEVICE

TECHNICAL FIELD

The disclosed embodiments relate to cellular computing devices, and more specifically, to a method and apparatus for controlling cellular reselection attempts on a computing device.

BACKGROUND

Computing devices, particularly mobile computing devices and other small form-factor computing devices, are configured to connect to telecommunication systems, such as the Uniform Mobile Telecommunications System (UMTS), by connecting to a nearby cell tower. A cell tower enables multiple mobile computing devices to connect to the network as long as the mobile computing devices are within range of the cell tower (i.e., within the cell region).

Cellular devices, such as mobile computing devices, typically employ communication protocols and processes in maintaining communications with cellular networks, while trying to preserve power and other resources. For example, many mobile computing devices use a DRX process to place a device cellular radio module into a low-power state (e.g. sleep) when appropriate. In a DRX process, the cellular radio module of a mobile device is placed into a low-power state, then wakened at specific intervals, during which the device performs tasks, such as check for paging messages from the cellular network.

DETAILED DESCRIPTION

Figure 1:
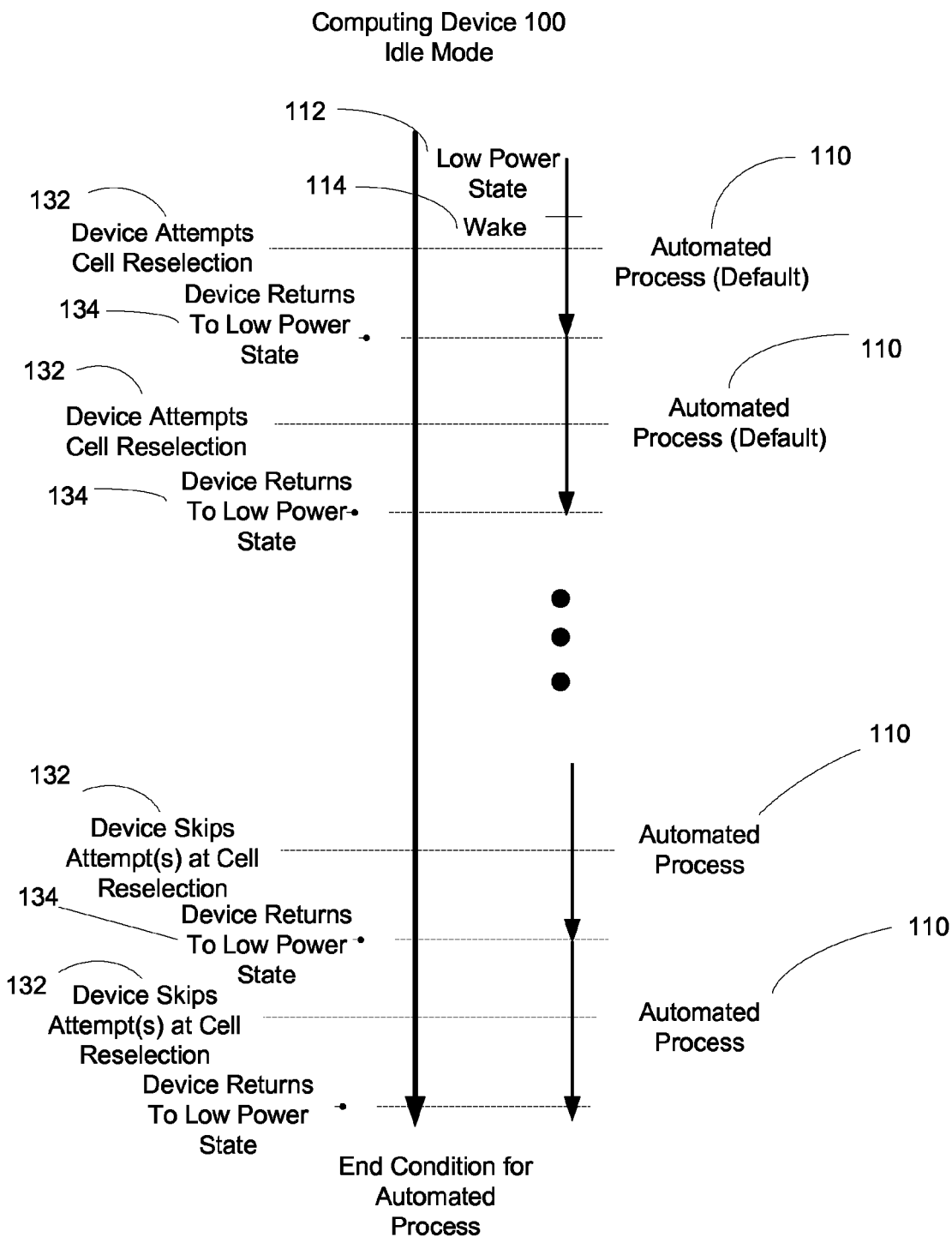
FIG. 1 illustrates an example of a series of processes that are performed by a computing device in a cellular environment, in accordance with embodiments described herein.

Embodiments described herein provide for a method and apparatus for controlling cellular reselection attempts on a computing device. In an embodiment, a computing device performs an automated process to repeatedly check the adequacy of the serving cell that it is currently assigned to. The computing device performs the check to determine whether it should perform a neighbor search and cell reselection. If the computing device determines the presence of particular conditions, it can perform the reselection by a default automated process. On the other hand, if the computing device determines criteria based, at least in part, on past instances, the computing device can modify the default automated process and skip attempts at performing neighbor search and cell reselections.

As used herein, a cell that a device is connected to is termed a "serving cell". A cell that has a coverage region which overlaps with the serving cell is termed a neighboring or neighbor cell (of the particular serving cell).

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or may alternatively be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 illustrates a series of processes that are performed by a computing device in a cellular environment, in accordance with embodiments described herein. In FIG. 1, a computing device 100 may correspond to any device that operates on a cellular environment. Specific examples include, (i) a mobile computing device, such as a device capable of cellular telephony and/or data transmissions; (ii) a laptop or tablet that is equipped with a cellular modem; or (iii) a cellular modem that integrates with another computing device.

In idle mode, the computing device 100 is configured to perform an automated process in a continuous and repeated manner to maintain communications with the network while conserving power and other resources. In one embodiment, the computing device 100 operates under a standard or protocol in which the automated process 110 is implemented on the device when the device is considered to be in an idle state. In such an idle state, the device 100 performs the automated process in order to place at least some radio resources (e.g. radio receiver) in a low-power state under conditions when the device does not expect to receive data from the cellular network. A specific example of an automated process is Discontinuous Reception (DRX), in which the device switches its radio module (or receiver) into a low-power state, and periodically wakens the radio module to determine whether there are messages from the cellular network, as well as to perform other activities (e.g. reacquire system information). A DRX process may be continuously performed when, for example, the device is in an idle state, using for example, established protocols such as described in standard 3GPP TS 25.304.

According to some embodiments, the computing device 100 performs the process 110 by (i) switching its radio module (or associated resources) into a low-power state for a given duration of time (e.g. 50-300 ms); (ii) waking the radio module to check for messages from the cellular network 112; (iii) performing other operations such as neighbor search (with possible cell reselection) and reacquiring system information, (iv) returning the radio module to the low-power state 114. The operation of neighbor search includes identifying and evaluating neighboring cells to the device's particular serving cell. The process 110 is repeated as a cycle. By placing the radio module in the low-power state during process 110, and repeatedly performing the process, the device 100 is able to conserve data resources associated with continuous use of the radio module.

In variations, the process 110 may provide for the radio module or other resources of the computing device to perform other tasks. In particular, embodiments recognize that when certain conditions are present relating to poor cellular conditions in the serving cell of the computing device 100, the device may perform a neighbor search and cellular reselection 132 as part of the automated process 110.

Embodiments recognize that cellular reselection is an additional power consuming process that can have periods of predictable futility. Moreover, embodiments recognize that cellular reselection failures can be persistent for cycles of automated process 110. In particular, embodiments recognize that cellular reselection attempts can be skipped based on criteria that include recent historical results for such attempts, without significant loss of better service. With reference to FIG. 1, the automated process 110 (e.g. DRX process) may be performed under default to include an additional step 132 of attempting neighbor search and cellular reselection. If the cellular reselection attempt fails, the device performs the step 134 of returning to low power state 112. The radio module is then returned to the low power state 112.

In performing the step of attempting neighbor search and cellular reselection 132, embodiments provide that the device 100 may check to determine if conditions are present to warrant the attempt for neighbor search and cellular reselection. In order to evaluate whether skipping is warranted, characteristics of the serving cell may be analyzed, such as those that correspond to power and/or quality. These characteristics may be measured to determine if the cellular characteristics are within a given classification. When such characteristics are above the threshold, cellular reselection (including neighbor search) can be skipped. In addition, criteria formulated from evaluation of prior neighbor searches and reselection may be used to evaluate whether skipping cell reselection is warranted.

According to some embodiments, criteria is developed based on parameters that identify results or outcomes from repeated performance of the automated process 110 over a given time. Such results or outcomes may be based at least in part on recent instances when attempts of cellular reselection fail. The computing device 100 may use the criteria to determine whether the default process, by which cellular reselection is to be attempted, is to be modified or circumvented so that the neighbor search and cellular reselection attempt is skipped. In one embodiment, the default process is modified as follows: (i) during the automated process 110, the device 100 transitions from the low power state 112 to the wakened state 114 and checks cellular transmission characteristics (e.g. power and/or quality) of the serving cell; (ii) if the cellular transmission characteristics are above a threshold, the device 100 does not perform a cellular reselection attempt (a so-called "natural gap"); and (iii) if the cellular transmission characteristics of the serving cell are below the threshold, the device 100 uses the criteria in making a determination as to whether the cellular reselection is to be attempted, or skipped.

Default performance of the automated process 110 corresponds to device 100 attempting cellular reselection; else the automated process 110 is modified to skip the attempt at cellular reselection 132. As mentioned, the criteria for determining whether automated process 110 is performed by default or otherwise is based, at least in part, on recent historical data that indicates that attempts at cellular reselection in a given cycle of process 110 is likely futile. By skipping attempts at cellular reselection when cellular transmission characteristics of the serving cell otherwise indicate that the cellular reselection attempt is warranted, the device 100 is able to conserve power and resources above and beyond those provided by implementing the designated process 110.

Figure 2:
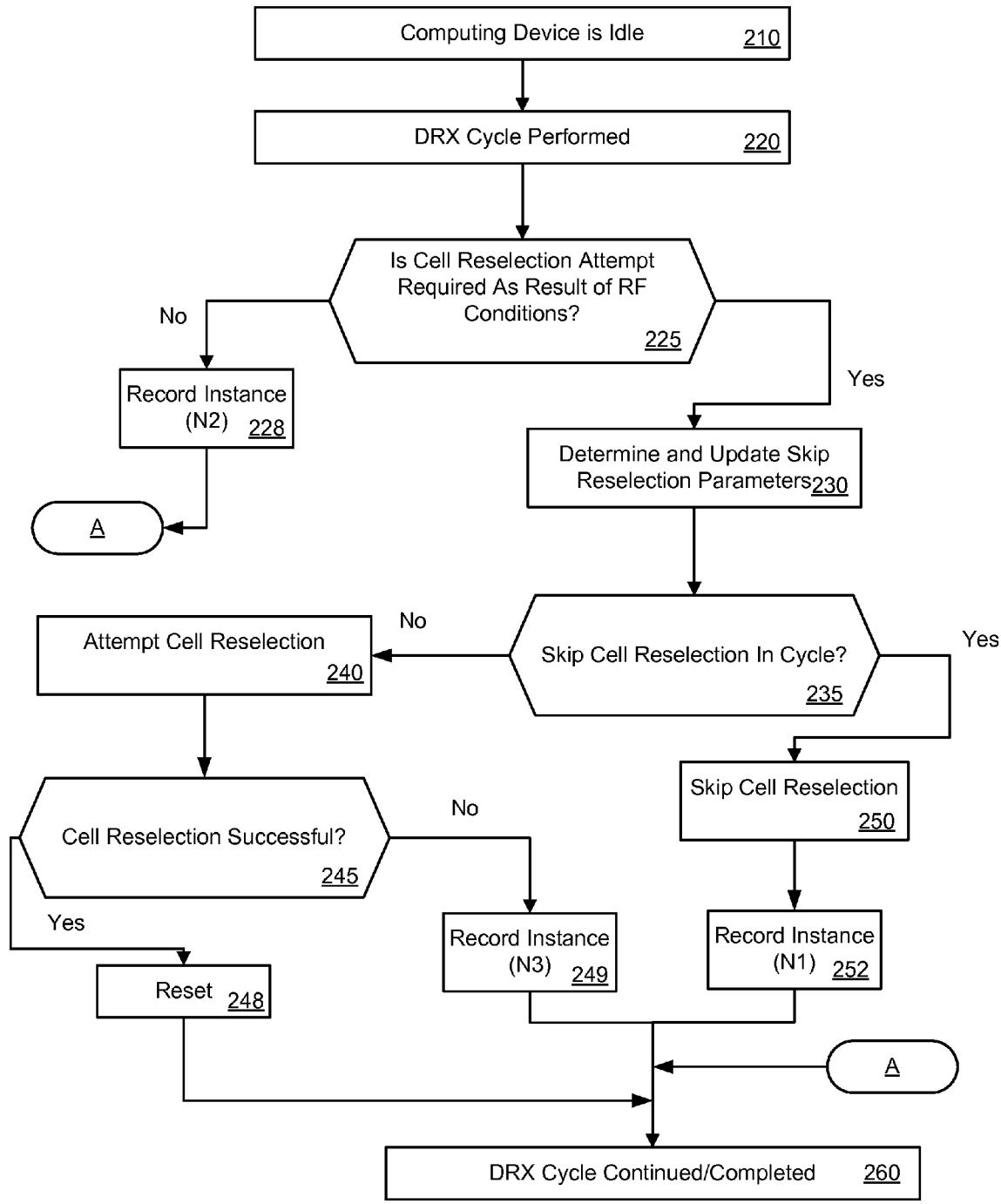
FIG. 2 illustrates an example of a method that can be implemented on a computing device in accordance with embodiments describe herein.

FIG. 2 illustrates a method that can be implemented on a computing device in accordance with embodiments describe herein.

A computing device is triggered into implementing a process to conserve power in a cellular environment (210). For example, the computing device may operate in an idle state, when the device is not likely to require continuous or instantaneous communications with the cellular network. In one embodiment, the computing device cycles DRX processes (e.g. 3GPP TS 25.304) (220).

As part of the DRX process, a computing device makes a determination as to whether a neighbor search and cellular reselection attempt is warranted (225), based on radio frequency conditions of the serving cell and the neighboring cells. As described with an embodiment of FIG. 1, such a determination may be made following the device (or its radio module or receiver) waking in the duration of a DRX cycle. If the cellular conditions indicate that cellular reselection attempt is not needed, the particular instance is recorded (228). A threshold for characteristics of the cellular transmission from the serving cell may be set from the cellular network; although in variations, such threshold may be determined from other sources or algorithmically. The instance may serve as a parameter for determination in subsequent DRX cycles as to whether the cellular reselection attempt is likely to fail. When cellular transmission characteristics of the serving cell are above the threshold, the DRX cycle is continued with the radio module returning to, for example, sleep or stand-by mode.

If the determination is that the neighbor search and cellular reselection attempt is warranted, an embodiment provides that parameters are determined that relate to the likelihood of any cellular reselection attempt being futile (230). The determined parameters can also be updated from values previously held. From the parameters, another determination is made as to whether the cellular reselection attempt should be skipped (235). Such a determination coincides with, for example, whether or not default performance of the DRX process is warranted.

If criteria formulated from the parameters indicate that cellular reselection attempt should be attempted, then the neighbor search and cellular reselection attempt is made during the DRX process (240). This may coincide with default performance of the DRX process. Following an attempted neighbor search and cell reselection (including a neighbor search), a determination is made as to whether the neighbor search and cell reselection was successful (245). The neighbor search and cell reselection attempt may be successful when, for example, neighboring cells providing better cellular transmission. If the cellular reselection attempt is successful, one or more embodiments provide for resetting parameters that are subsequently used for determining whether cellular reselection attempts should be skipped (248). The successful reselection is highly indicative that conditions for persistent reselection failures have changed.

If the cellular reselection attempt is not successful, embodiments provide that the instance of the failure is recorded (N3) (249). Such an instance may be used as a parameter for subsequently determining whether attempts at cellular reselection are warranted when cellular transmission characteristics of the serving cell are below the designated threshold.

If criteria formulated from the parameters indicate that the cellular reselection attempt is likely to fail, then cellular reselection is skipped (250). Some embodiments recognize that skipping the cellular reselection attempt during the DRX process (when transmission characteristics in the serving cell are below the threshold) is a deviation from the default process. However, variations may provide that the DRX process (or its equivalent variation) may make case-by-case determinations as to whether cellular reselection attempt are warranted or not. The instance of skipping the cellular reselection attempt is recorded (N1) (252). Such an instance may serve as a parameter for criteria in determining when skipping is warranted in follow on cycles.

Following reselection attempt or skipping, the DRX process may be continued (260), provided conditions continue to warrant the DRX cycle (e.g. device remains idle). In one embodiment, for example, the device switches is radio receiver and related resources into the low power state, and repeats a process such as described (e.g. steps 210-260).

According to an embodiment, parameters for determining when reselection should be skipped include: (i) number of consecutive times that reselection has been skipped as a result of an algorithmic determination that the cellular reselection attempt would likely fail (N(1)); (ii) number of consecutive natural gaps, coinciding when cellular reselection is not required because of cellular transmission characteristics from the serving cell being above the designated threshold (N(2)); and (iii) number of consecutive DRX cycles when cellular reselection is attempted without a predefined number of natural gaps (N(3)).

In one embodiment, an algorithm for determining whether to skip a cellular reselection attempt (see step 235) is:

---

If a) S >0
b) 95dBm <= (RSCP of serving cell)<= −108dBm; and
c) 1/2 $S_{inter}$ <= S <= 7/8 $S_{inter}$
then
if N(3) <= 50, then N = 0; else
if N(3)> 50, N = Min( (N(3)/50)modulo Max_cycles_to_skip, (2*(10−k) −1)

--- wherein S is a cell selection criterion, $S_{inter}$ is i a threshold for intra or inter frequency measurement, k is the DRX cycle length coefficient, and Max_cycles_to_skip is a customizable quantity that represents the highest number of cycles that can be skipped minus one. These parameters are explained more fully in the 3GPP TS 25.304 standard.

If N<N1 then the current cycle is skipped, else not;
wherein N is the number of consecutive cycles in which skipping of cellular reselection occurs.

As a result of performing the algorithm, a certain ratio of cycles will skip the cellular reselect attempt. This ratio may range, for example, between 50%-80%.

As mentioned above, parameters for use as criteria in determining skip occurrences may be reset in response to certain conditions. These include (i) when the device exits the idle state, (ii) when network updates the cell reselection parameters (either through system information or by receipt of measurement control message), when (N(2)) becomes greater than a predetermined quantity; or (iv) when neighbor search and cell reselection succeeds.

Figure 3:
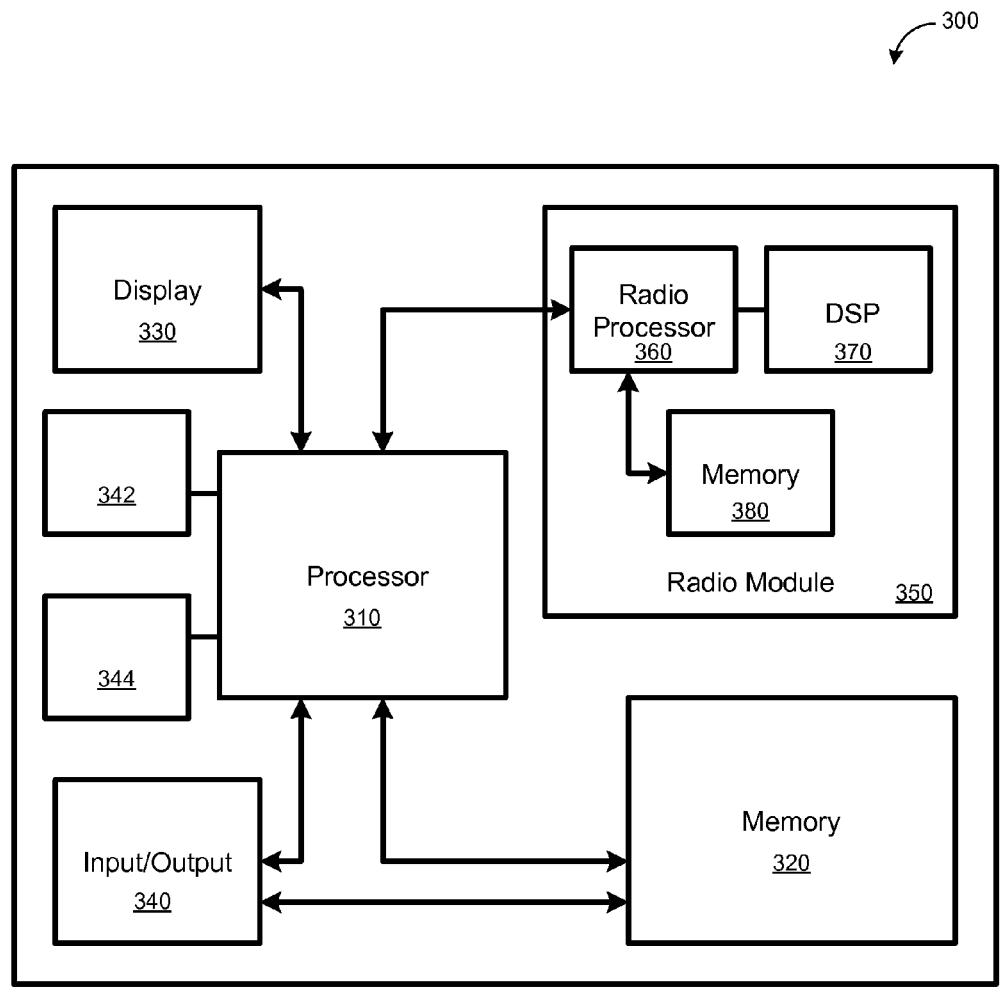
FIG. 3 illustrates an example of a hardware diagram of a computing device for use with one or more embodiments.

FIG. 3 illustrates a hardware diagram of a computing device for use with one or more embodiments. A computing device may correspond to any device that can operate on a cellular network, including mobile computing devices such as cellular-telephony/messaging devices, laptops, or modem modules. In FIG. 3, device 300 includes a processor 310, memory resources 320, display 330, wireless (e.g. Bluetooth, Wireless Fidelity 802.11(b), (g) or (n)), and wireline communication ports 342, 344 and input/output components 340 (buttons, touch-screen input, microphone etc.). The device 300 also includes a radio module 350 for cellular voice and data transmissions.

In one implementation, radio module 350 includes processing and memory resources separate from the main processor/memory of the device. The radio module 350 includes a modem processor 360, a digital signal processor (DSP) 370 and memory resources 380. In numerous embodiments described herein, algorithms and programmatically made determinations or operations can be performed on the radio module 350. In some embodiments, modem processor 360 performs processes or steps described with, for example, FIG. 1, and FIG. 2.

Embodiments described herein include individual elements and concepts described herein, independently of other concepts, ideas or systems, as well as combinations of elements recited anywhere in this application. Although illustrative embodiments of the invention have been described in detail with reference to the accompanying drawings, it is to be understood that the described embodiments are not limited to those precise embodiments, but rather include modifications and variations as provided. Furthermore, a particular feature described either individually or as part of an embodiment can be combined with other individually described features, or parts of other embodiments, even if the other features and embodiments make no mention of the particular feature.

What is claimed is:

1. A method for operating a computing device on a cellular network, the method comprising:
    performing an automated process in which the computing device is programmed to automatically and repeatedly check an adequacy of a serving cell that the computing device is currently assigned to for purpose of determining whether neighbor search and cell reselection is to be performed by the computing device;
    determining presence of a condition in which neighbor search and cell reselection is to be performed by a default performance of the automated process;
    identifying a result of one or more past instances in which the computing device, by the default performance of the automated process, attempted to perform neighbor search and cell reselection as a result of the presence of the condition;

determining criteria for attempting neighbor search and cell reselection based at least in part on the result of the one or more past instances;

based on the criteria, determining that the default performance of the automated process is to be modified; and in response to determining that the default performance of the automated process is to be modified, skipping an attempt at performing neighbor search and cell reselection, as would otherwise be required by the default performance of the automated process, when performing the automated process.

2. The method of claim 1, wherein performing the automated process includes performing a Discontinuous Reception (DRX) process in which a radio module of the computing device is placed into a low power state and then awakened.

3. The method of claim 1, wherein determining presence of the condition in which neighbor search and cell reselection is to be performed includes determining that one or more characteristics of a cellular transmission from the serving cell is below a designated threshold.

4. The method of claim 3, wherein the one or more characteristics is based at least in part on a power level or quality of the transmission as received on the computing device.

5. The method of claim 3, wherein the designated threshold is a network determined level.

6. The method of claim 1, wherein determining the criteria includes determining a number of past instances of a specified duration in which neighbor search and cell reselection was attempted and failed.

7. The method of claim 6, wherein determining the number of past instances includes determining a number of consecutive past instances in which neighbor search and cell reselection was attempted and failed.

8. The method of claim 1, wherein determining the criteria includes determining a number of past instances of a specified duration in which neighbor search and cell reselection is not attempted.

9. The method of claim 1, wherein determining the criteria includes determining a number of past instances of a specified duration in which neighbor search and cell reselection is skipped.

10. The method of claim 1, wherein the automated process is performed when the computing device is in an idle state.

11. The method of claim 10, further comprising discontinuing the automated process when the computing device is out of the idle state.

12. The method of claim 1, further comprising discontinuing the automated process when the condition is updated by the cellular network.

13. The method of claim 1, further comprising discontinuing the automated process upon occurrence of a successful neighbor search and cell reselection.

14. The method of claim 1, wherein performing the automated process is initiated when the computing device is in an idle state.

15. A computing device comprising:
a radio module including a plurality of hardware components, the plurality of hardware components including one or more processors;
wherein the one or more processors are configured to:
perform an automated process in which the radio module is programmed to automatically and repeatedly check an adequacy of a serving cell that the computing device is currently assigned to for purpose of determining whether neighbor search and cell reselection is to be performed by the computing device;
determine presence of a condition in which neighbor search and cell reselection is to be performed by a default performance of the automated process;
identify a result of one or more past instances in which the computing device, by the default performance of the automated process, attempted to perform neighbor search and cell reselection as a result of the presence of the condition;
determine criteria for attempting neighbor search and cell reselection based at least in part on the result of the one or more past instances;
based on the criteria, determine that the default performance of the automated process is to be modified; and
in response to determining that the default performance of the automated process is to be modified, skip an attempt at performing neighbor search and cell reselection, as would otherwise be required by the default performance of the automated process, when performing the automated process.

16. The computing device of claim 15, wherein the one or more processors determine the criteria by determining a number of past instances of a specified duration in which neighbor search and cell reselection was attempted and failed.

17. The computing device of claim 16, wherein the one or more processors determine the criteria by determining a number of consecutive past instances in which neighbor search and cell reselection was attempted and failed.

18. The computing device of claim 15, wherein the one or more processors determine the criteria by determining a number of past instances of a specified duration in which neighbor search and cell reselection is not attempted.

19. The computing device of claim 15, wherein the one or more processors determine the criteria by determining a number of past instances of a specified duration in which neighbor search and cell reselection is skipped.

20. A radio module including a plurality of hardware components for a computing device, the radio module comprising:
a memory resource storing instructions;
one or more processors coupled to the memory resource, the one or more processors to:
perform an automated process in which the radio module is programmed to automatically and repeatedly check an adequacy of a serving cell that the computing device is currently assigned to for purpose of determining whether neighbor search and cell reselection is to be performed by the computing device;
determine presence of a condition in which neighbor search and cell reselection is to be performed by a default performance of the automated process;
identify a result of one or more past instances in which the computing device, by the default performance of the automated process, attempted to perform neighbor search and cell reselection as a result of the presence of the condition;
determine criteria for attempting neighbor search and cell reselection based at least in part on the result of the one or more past instances;
based on the criteria, determine that the default performance of the automated process is to be modified; and
in response to determining that the default performance of the automated process is to be modified, skip an attempt at performing neighbor search and cell reselection, as would otherwise be required by the default performance of the automated process, when performing the automated process.

* * * * *